United States Patent
Mabuchi

(10) Patent No.: US 9,298,577 B2
(45) Date of Patent: Mar. 29, 2016

(54) PREDICTING BUS IDLE TIME BASED ON OBTAINED USAGE DATA OF A BUS

(71) Applicant: Mitsuhiro Mabuchi, Tokyo (JP)

(72) Inventor: Mitsuhiro Mabuchi, Tokyo (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/424,631

(22) PCT Filed: Sep. 19, 2012

(86) PCT No.: PCT/JP2012/073936
§ 371 (c)(1),
(2) Date: Feb. 27, 2015

(87) PCT Pub. No.: WO2014/045354
PCT Pub. Date: Mar. 27, 2014

(65) Prior Publication Data
US 2015/0220412 A1    Aug. 6, 2015

(51) Int. Cl.
*G06F 11/30* (2006.01)
*H04L 12/801* (2013.01)
(Continued)

(52) U.S. Cl.
CPC ........ *G06F 11/3051* (2013.01); *G06F 11/3048* (2013.01); *G06F 11/3065* (2013.01); *G06F 11/3423* (2013.01); *H04J 3/0652* (2013.01); *H04L 12/28* (2013.01); *H04L 12/40* (2013.01); *H04L 12/4135* (2013.01);
(Continued)

(58) Field of Classification Search
None
See application file for complete search history.

(56) References Cited

U.S. PATENT DOCUMENTS 4,764,920 A * 8/1988 Furuya .................. 370/437
7,564,810 B2 * 7/2009 Hernandez et al. ........... 370/311
(Continued)

FOREIGN PATENT DOCUMENTS

EP       2618525 A1 *  7/2013
JP       2007-60400 A   3/2007
(Continued)

OTHER PUBLICATIONS

ISO 11898-1 International Standard 'Road vehicles—Controller Area Network (CAN)—Part 1: Data link layer and physical signalling,' First edition, Dec. 1, 2003.*
(Continued)

*Primary Examiner* — Steven Snyder
(74) *Attorney, Agent, or Firm* — Sughrue Mion, PLLC

(57) ABSTRACT

In order to provide a communication apparatus that can reduce the delay in transmission of communication messages even when the bus load is heavy, a data transmission module is connected to a communication bus, over which communication messages are transferred, in such a manner that the data transmission module can transmit/receive the communication messages to/from the communication bus. A bus monitoring unit included in the data transmission module detects, for a given time period, the timings at which communication messages are flowing over the communication bus, and acquires the detection results as usage status data of said time period. The data transmission module further includes: a usage status predicting unit that predicts, on the basis of the acquired usage status data of the detection time period, an idle timing at which no communication messages are flowing over the communication bus; and a data transmitting unit that transmits communication messages to the communication bus at the predicted idle timing.

12 Claims, 3 Drawing Sheets

(51) Int. Cl.
- *H04L 12/911* (2013.01)
- *G06F 11/34* (2006.01)
- *H04L 12/413* (2006.01)
- *H04J 3/06* (2006.01)
- *H04L 12/28* (2006.01)
- *H04L 12/40* (2006.01)

(52) U.S. Cl.
CPC ............. *H04L 47/10* (2013.01); *H04L 47/741* (2013.01); *H04L 47/822* (2013.01); *H04L 47/823* (2013.01); *H04L 2012/40215* (2013.01)

(56) References Cited

U.S. PATENT DOCUMENTS

| | | | | |
|---|---|---|---|---|
| 8,578,008 | B1* | 11/2013 | Sella et al. | 709/221 |
| 8,638,658 | B2* | 1/2014 | Murayama et al. | 370/216 |
| 8,700,819 | B2* | 4/2014 | Dalal et al. | 710/32 |
| 8,782,211 | B1* | 7/2014 | Sharma | 709/224 |
| 2008/0056131 | A1* | 3/2008 | Balakrishnan et al. | 370/232 |
| 2010/0115167 | A1* | 5/2010 | Tardieux et al. | 710/240 |
| 2011/0273978 | A1 | 11/2011 | Murayama et al. | |
| 2012/0120796 | A1* | 5/2012 | Chu et al. | 370/230 |
| 2012/0124398 | A1* | 5/2012 | Diab | 713/310 |
| 2013/0339721 | A1 | 12/2013 | Yasuda | |
| 2015/0113156 | A1* | 4/2015 | Smith | 709/231 |

FOREIGN PATENT DOCUMENTS

| | | |
|---|---|---|
| JP | 2007-228338 A | 9/2007 |
| JP | 2009-135567 A | 6/2009 |
| JP | 2012-178035 A | 9/2012 |
| WO | 2010/079538 A1 | 7/2010 |
| WO | WO 2012114194 A1 * | 8/2012 |
| WO | WO 2014083775 A1 * | 6/2014 |

OTHER PUBLICATIONS

ISO 11519-1 International Standard 'Road vehicles—Low-speed serial data communication—Part 1: General and definitions,' First edition, Jun. 15, 1994.*

'An Overview of Controller Area Network (CAN) Technology' from Machine Bus Corporation, Nov. 12, 2003.*

'Vehicle Networks—Controller Area Network (CAN)' by Dr. Thomas Strang and Matthias Rockl, 2008/2009.*

Untitled Training (CAN basics) from Ulrik HAgstrom, 2009.*

* cited by examiner

PREDICTING BUS IDLE TIME BASED ON OBTAINED USAGE DATA OF A BUS

CROSS REFERENCE TO RELATED APPLICATIONS

This application is a National Stage of International Application No. PCT/JP2012/073936 filed Sep. 19, 2012, the contents of all of which is incorporated herein by reference in its entirety.

FIELD OF THE DISCLOSURE

The present invention relates to a communication apparatus connected to a network of, for example, a vehicle and relates to a communication method for use in the communication apparatus.

BACKGROUND OF THE DISCLOSURE

As is generally known, in many cases, a plurality of electronic control units (ECU) mounted in a vehicle configure a communication system in which pieces of information (vehicle information) possessed by the electronic control units are communicable to each other by allowing the respective electronic control units to make a network connection to each other. A controller area network (CAN) is as one of such vehicle network systems.

In the CAN, arbitration related to message transmission is performed based on a message ID, which is an ID particular to a message, when message transmissions from ECUs coincide with each other. Thereafter, only the highest-priority message among messages whose transmissions coincide with each other is permitted to be transmitted, and the other messages are kept waiting to be transmitted. In the CAN, the number of cases in which message transmissions coincide with each other becomes larger in proportion to an increase in messages that flow through the bus. Therefore, the possibility that a delay will occur in message transmission rises. Therefore, techniques for reducing a delay caused when messages are transmitted have been heretofore proposed, and its one example is described in Patent Document 1.

A data transfer unit described in Patent Document 1 is a device that transfers messages between two communication buses. The data transfer unit includes a first frame control module that transmits/receives messages to/from a first communication bus, a second frame control module that transmits/receives messages to/from a second communication bus, and a microcomputer that is connected to these two frame control modules and is capable of transferring messages therebetween. The microcomputer is provided with a communication bus load monitoring device, which measures the bus load of the first communication bus or that of the second communication bus. The data transfer unit additionally includes a first receive-only module, which transfers a message received from the first communication bus to the second frame control module, and a second receive-only module, which transfers a message received from the second communication bus to the first frame control module. Each receive-only module includes a reception selecting register. The microcomputer sets, in the reception selecting register, a shielding rate, according to which the transfer of a message to a frame control module that is a transfer destination is restrained. When the bus load of the second communication bus becomes 50% or more, the microcomputer sets the shielding rate of the reception selecting register of the first receive-only module at a low shielding rate for a message having high priority and at a high shielding rate for a message having low priority, so that the delay of the message having high priority is reduced.

PRIOR ART DOCUMENT

Patent Document

Patent Document 1: Japanese Laid-Open Patent Publication No. 2009-135567

SUMMARY OF THE INVENTION

Problems that the Invention is to Solve

According to the data transfer unit described in Patent Document 1, the possibility that a delay will occur in transmission is still at a high level because the bus load is inherently high although the delay of a message having high priority is reduced when the bus load is high. Additionally, in this data transfer unit, no consideration is given to a transmission delay caused in a message having low priority.

Accordingly, it is an objective of the present invention to provide a communication apparatus capable of reducing a delay in transmission of communication messages even when a bus load is high and to provide a communication method for use in the communication apparatus.

Means for Solving the Problems

Means for achieving the above objective and advantages thereof will now be discussed.

To achieve the foregoing objective and in accordance with one aspect of the present invention, a communication apparatus is provided that is connected to a communication line, through which communication messages are transferred, to be capable of transmitting and receiving communication messages. The communication apparatus includes a detecting unit, a predicting unit, and a transmitting unit. The detecting unit detects a period in which a communication message flows through the communication line during a fixed period of time and that obtains a detection result thereof as usage status data of this period. Based on the obtained usage status data of the detection period, the predicting unit predicts an idle time in which a communication message does not flow through the communication line. The transmitting unit that transmits a communication message to the communication line in the predicted idle time.

To achieve the foregoing objective and in accordance with another aspect of the present invention, a communication method is provided that is used by a communication apparatus to transmit communication messages. The communication apparatus is connected to a communication line, through which communication messages are transferred, to be capable of transmitting and receiving communication messages. The communication method includes: detecting a period in which a communication message flows through the communication line during a fixed period of time and obtaining a detection result thereof as usage status data of this period; based on the obtained usage status data of the detection period, predicting an idle time in which a communication message does not flow through the communication line; and transmitting a communication message to the communication line in the predicted idle time.

According to this configuration or this method, the communication apparatus is capable of transmitting a communication message to the communication line in an idle time predicted with respect to this communication line, in which period no communication messages are transmitted. The transmission of a communication message in the idle time by the communication apparatus reduces the possibility that the transmission of this communication message will coincide with the transmission of a communication message from another communication apparatus and will be delayed.

Additionally, in a communication message transmitted in the idle time, arbitration does not occur between this communication message and another communication message. Therefore, the communication message is readily transmitted regardless of the degree of the set priority.

Additionally, the communication apparatus performs the prediction of the idle time without depending on the transmission period of a communication message. Therefore, it is possible to properly deal with aperiodic transmission of a message transmitted in accordance with an event or properly deal with the transmission of a message of an offset period.

Additionally, transmission of a communication message in the idle time reduces an influence exerted on an existing message to be transmitted, e.g., restrains the occurrence of a delay caused by putting the transmission on standby.

It is preferable that, based on one or more pieces of usage status data including usage status data corresponding to a latest detection period, the predicting unit predict an idle time of a following detection period subsequent to the latest detection period.

According to this configuration, it is possible for the communication apparatus to predict an idle time based on the latest usage status data obtained in a detection period.

It is preferable that the detection period include a plurality of periodically consecutive determination periods, that the detecting unit repeatedly detect a period in which a communication message flows to the communication line for each of the determination periods, and that the predicting unit predict an idle time of the following detection period for each of the determination periods.

According to this configuration, the prediction of the idle time is performed based on the setting of both the detection period and the determination period. Therefore, the idle time is easily predicted.

It is preferable that, based on a detection result of one of the determination periods included in the usage status data, the predicting unit predict an idle time of the following detection period corresponding to the one of the determination periods.

According to this configuration, based on a detection result of the determination period obtained from usage status data, the idle time corresponding to this determination period in the following detection period is predicted. Therefore, the idle time is properly predicted.

It is preferable that the predicting unit obtain one or more detection results from a to-be-targeted determination period in the one or more pieces of usage status data, calculate a communication message based on the obtained one or more detection results, and compare, with a threshold value, a ratio at which the calculate communication message does not flow, thereby predicting an idle period of the following detection period corresponding to the to-be-targeted determination period.

According to this configuration, it is possible to calculate the idle time based on a comparison between the threshold value and the detection result with respect to one determination period of the one or more pieces of usage status data. In other words, it is possible to flexibly perform the predicting process.

Additionally, when a plurality of pieces of usage status data is used, the idle time is properly predicted based on the ratio at which a communication message does not flow even if there are differences between detection the results of the pieces of usage status data.

It is preferable that, each time a detection result is obtained with respect to each determination period of the latest detection period, the predicting unit predict an idle time of the following detection period corresponding to a determination period for which the detection result has been obtained.

According to this configuration, the idle time of the following detection period is predicted in accordance with the fact that the detection result of the determination period is obtained in the usage status data of the latest detection period. Therefore, sufficient time is secured for the prediction of the idle time for the following detection period which will start subsequent to the latest detection period.

It is preferable that the predicting unit predict the idle period in consideration of a weight based on utility that is set in the usage status data.

According to this configuration, the prediction of the idle time is performed in consideration of the utility of the usage status data.

It is preferable that the weight be set to be highest with respect to the usage status data of the latest detection period, and that the older the usage status data, the lower the weight become.

According to this configuration, the weight is set to become higher in proportion to the proximity to the following detection period, in which the idle time will be predicted, and to become lower in proportion to the temporal distance from the following detection period. This allows the prediction to be performed while placing much importance on the new usage status data.

It is preferable that the detecting unit do not include communication messages transmitted from the transmitting unit in the obtained usage status data.

According to this configuration, the prediction of the idle time is unaffected by a communication message transmitted by the transmitting unit itself. Therefore, it is possible to properly predict the idle time when a communication message is transmitted in a continuous detection period.

It is preferable that the detection period be periodically set in a range of from 100 ms to 10 s.

According to this configuration, it is possible to include many periodic messages in the detection period. Therefore, the prediction accuracy is improved.

It is preferable that the detection period be set in accordance with a period of a communication message having a long transmission period.

According to this configuration, it is possible to include the transmission periods of many periodic messages in a detection period. Therefore, the prediction accuracy is improved.

It is preferable that the detection period be set in accordance with a period that is a lowest common multiple of transmission periods of a plurality of communication messages.

According to this configuration, the detection period suits the transmission periods of a plurality of periodic messages to be targeted. Therefore, the prediction accuracy is improved.

It is preferable that a part of or an entirety of the communication line be mounted in a vehicle, and that the communication message be based on a CAN protocol.

According to this configuration, even when a bus load generated in the communicative bus by means of a communication message of a CAN protocol, which is often employed in an in-vehicle LAN, is high, a delay caused in the communication message is reduced. An important message concerning the traveling of the vehicle is included in the in-vehicle LAN. This reduces, for example, the possibility that this important message will be delayed by the influence of a message whose importance is lower.

DETAILED DESCRIPTION OF THE PREFERRED EMBODIMENTS

First Embodiment

A communication system including a communication apparatus according to a first embodiment of the present invention will now be described with reference to FIGS. 1 to 4.

Figure 1:
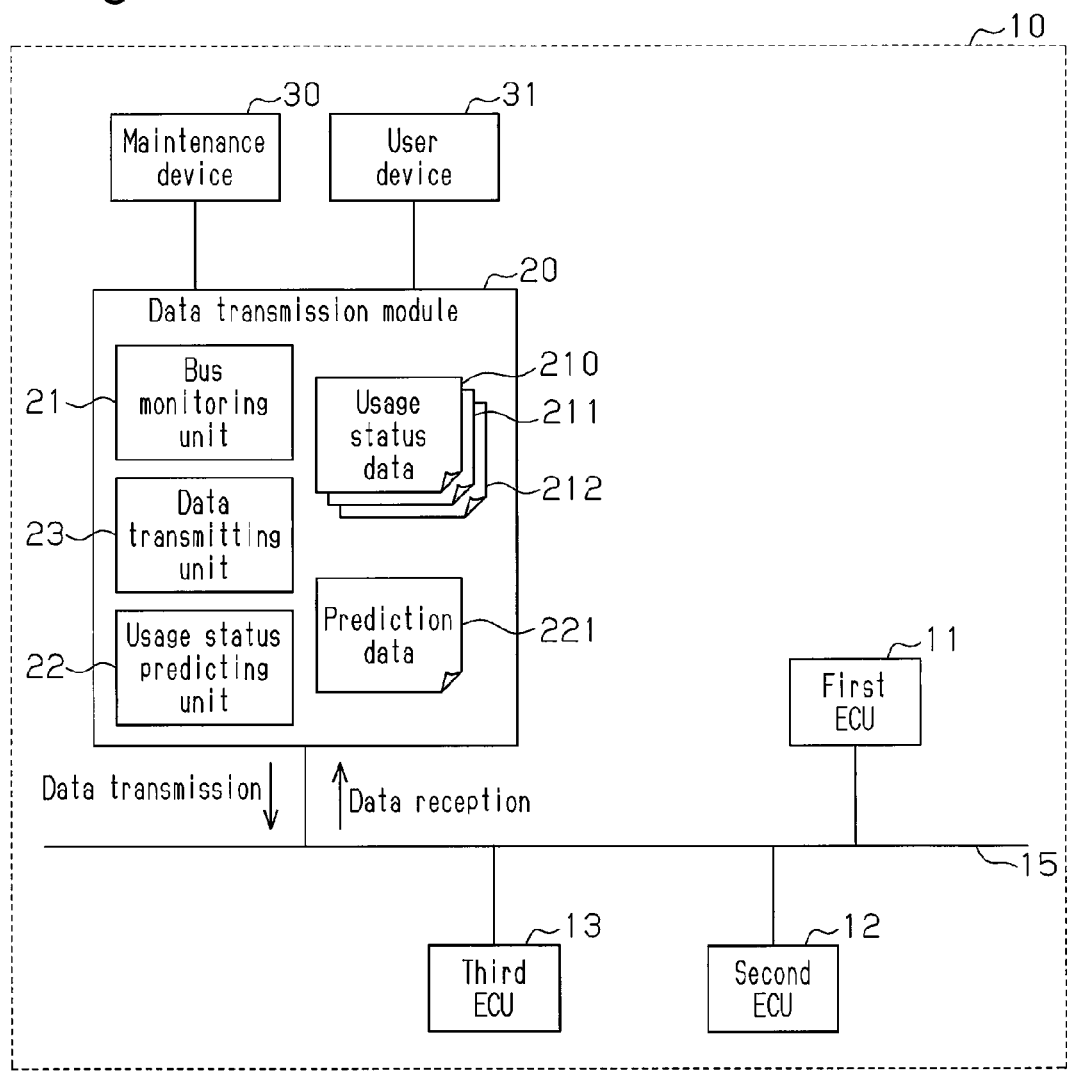
FIG. 1 is a block diagram showing a schematic configuration of a communication system including a communication apparatus according to a first embodiment of the present invention.

As shown in FIG. 1, a vehicle 10 includes an in-vehicle network system serving as a communication system. The in-vehicle network system includes first to third electronic control units (ECU) 11 to 13, a data transmission module 20, and a communicative bus 15 serving as a communication line, to which the first to third ECUs 11 to 13 and the data transmission module 20 are connected. The first to third ECUs 11 to 13 and the data transmission module 20 are capable of mutually transferring (transmitting and receiving) various pieces of information for use in, for example, a control operation via the communicative bus 15.

The in-vehicle network system of the present embodiment is configured as a CAN network to which a controller area network (CAN) protocol is applied as a communication protocol. In other words, the communicative bus 15 is, for example, a twisted-pair cable. The first to third ECUs 11 to 13 and the data transmission module 20 respectively include a CAN controller that transmits/receives communication messages based on the CAN protocol to/from the communicative bus 15. The first to third ECUs 11 to 13 and the data transmission module 20 mutually transfer various pieces of information for use in, for example, a control operation based on the transmission/reception of communication messages based on the CAN protocol.

Each of the first to third ECUs 11 to 13 is a control device for use in various control operations of the vehicle 10, and is an ECU that controls systems, such as a drive system, a traveling system, a vehicle body system, and an information device system. For example, an engine ECU is one example of an ECU that controls the drive system, a steering ECU or a brake ECU is one example of an ECU that controls the traveling system, and a light ECU or a window ECU is one example of an ECU that controls the vehicle body system, and a car navigation ECU is one example of an ECU that controls the information device system.

The data transmission module 20 transfers communication messages input to the communicative bus 15 from an external device while restraining an influence exerted on the transfer of a communication message having high importance that is transferred in the in-vehicle network system and that is used to control the vehicle 10. The data transmission module 20 includes a data link connector (DLC) that is connected to an external device. In the data transmission module 20, communication messages including various pieces of information are input from the external device connected to the DLC, and the input communication messages are transferred to the communicative bus 15 when needed. Furthermore, communication messages received from the communicative bus 15 are transferred to the external device. In other words, a maintenance device 30 or a user device 31, which is an external device, is connected to the data transmission module 20 so that communication messages can be transferred.

The maintenance device 30 is a regular communication apparatus prepared for makers or car dealers, for example, such as a failure diagnosis device (tester) while using an in-vehicle failure diagnosis system, i.e., an onboard diagnosis (OBD) system.

The user device 31 is a non-regular communication apparatus independently prepared by a user, such as a non-regular tester or a smartphone. The user device 31 transmits communication messages based on a program created by, for example, a user. Therefore, in the user device 31, it is impossible to eliminate the possibility that a communication message will be transmitted without considering the bus load of the communicative bus 15 or the possibility that a large number of communication messages will be transmitted by a programming glitch or by malice. The user device 31 may be connected to an external system or a public network (e.g., the Internet). Therefore, in the user device 31, there is also a possibility that a large number of communication messages will be intended to be transmitted to the communicative bus 15 by means of unauthorized access or an attack through the Internet or the like.

The data transmission module 20 is configured to include a microcomputer having a central processing unit (CPU) and nonvolatile and volatile storage devices, such as a ROM and a RAM. A control program that performs various processes and various parameters that are used in various processes are held in the nonvolatile storage device of the data transmission module 20. When needed, the central processing unit performs the control program held in the storage device, and refers to the various parameters when the control program is executed if necessary. In the present embodiment, the control program includes a bus monitoring program that detects whether a communication message flows through the communicative bus 15 and obtains its detection result as a piece of usage status data and a usage status predicting program that predicts an idle time, which occurs in the communicative bus 15 and in which a communication message does not flow, from the obtained usage status data. The control program additionally includes a transmission command program that commands a communication message to be transmitted in a predicted idle time. These programs may be held in the data transmission module 20 as individual programs, and may be each performed as a program independent of the other programs.

The various parameters include a detection period Tc that is a fixed period of time during which the communicative bus 15 is monitored and a determination period Δt that is a period of time shorter than the detection period Tc.

Figure 2:
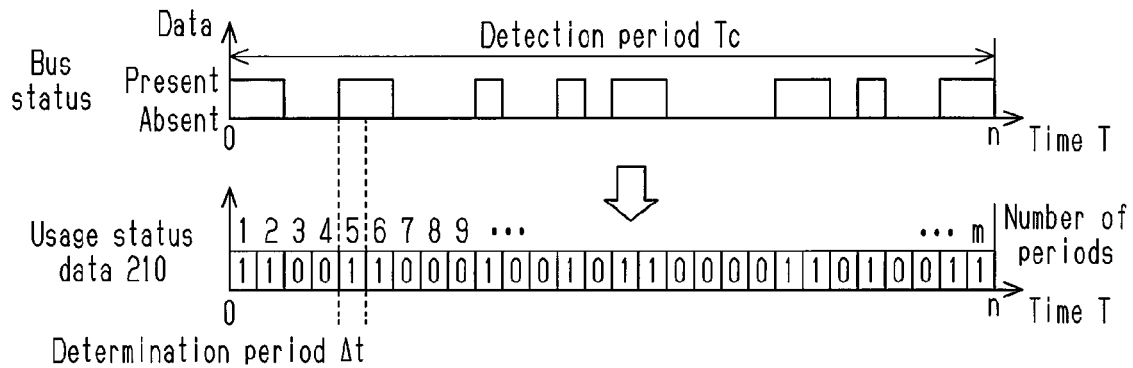
FIG. 2 is a diagram that schematically shows usage status data obtained in the communication system shown in FIG. 1.

As shown in FIG. 2, a plurality of determination periods Δt are included in the single detection period Tc, and the number m of determination periods Δt included in the detection period Tc is calculated according to "detection period Tc (time n)"/"determination period Δt."

The detection period Tc is one period of time when the presence or absence of a communication message flowing through the communicative bus 15 is monitored repeatedly (periodically). The detection period Tc has a period of time from reference time (time T=0) to ending time (T=n). Preferably, the detection period Tc includes communication periods of many communication messages in its interval, and, for example, values of from 100 milliseconds (ms) to 10 seconds (s) are set as a period of time suitable for monitoring the communicative bus 15. The detection period Tc may be shorter than 100 milliseconds or may be longer than 10 seconds. Additionally, the detection period Tc may be either a communication period of a communication message to be particularly monitored or its multiple, or may be either a communication period of a communication message having the longest period or its multiple, or may be a common multiple such as the lowest common multiple of communication periods of a plurality of communication messages.

The determination period Δt is a period of time for determining whether a communication message flows on the communicative bus 15 (i.e., whether there is data thereon). Preferably, the determination period Δt is the same in the amount of time as the shortest communication message or is longer than that, and is set at, for example, 500 microseconds (μs) to 1 millisecond as a period suitable for determining whether a communication message flows. The determination period Δt may be set at a period of time shorter than the shortest communication message, or may be less than 500 microseconds, or, contrary thereto, may be longer than 1 millisecond.

The data transmission module 20 is composed of a bus monitoring unit 21 serving as a detecting section that obtains the usage status data of the communicative bus 15, a usage status predicting unit 22 serving as a predicting section that predicts the idle time of the communicative bus 15 based on the usage status data, and a data transmitting unit 23 serving as a transmitting section that transmits a communication message to the communicative bus 15 based on the predicted idle time. In the bus monitoring unit 21, the usage status predicting unit 22, and the data transmitting unit 23, all of or a part of their functions is realized by allowing the aforementioned control program to be executed in the central processing unit of the data transmission module 20.

The bus monitoring unit 21 continually detects whether a communication message flows to the communicative bus 15, and obtains a detection result as a piece of usage status data 210. The bus monitoring unit 21 allows the volatile storage device or the like to hold the obtained usage status data 210. The bus monitoring unit 21 uses the detection period Tc as a single unit during which a communicative bus 15 is repeatedly monitored. The bus monitoring unit 21 obtains one piece of usage status data 210 with respect to one detection period Tc, and hence usage status data corresponding to each detection period Tc is obtained. In the present embodiment, the bus monitoring unit 21 obtains latest usage status data 210 correspondingly to a latest detection period Tc. Additionally, when a piece of the latest usage status data 210 is obtained, the bus monitoring unit 21 uses usage status data corresponding to the last detection period Tc as a piece of the last usage status data 211, and uses usage status data corresponding to the last but one detection period Tc as a piece of the last but one usage status data 212.

The bus monitoring unit 21 determines whether a communication message flows to the communicative bus 15 in each determination period Δt. When a state in which a communication message is being transmitted is included in the entire period of or the partial period of the determination period Δt, the bus monitoring unit 21 determines that a communication message is being transmitted during this determination period Δt. On the other hand, when a state in which a communication message is being transmitted is never included during the determination period Δt, the bus monitoring unit 21 determines that a communication message is not being transmitted during this determination period Δt, i.e., determines that this determination period Δt is an idle time. Thereafter, with respect to each determination period Δt included in the usage status data 210, the bus monitoring unit 21 sets "0" for a period during which a communication message is not being transmitted, and sets "1" for a period during which a communication message is being transmitted. The bus monitoring unit 21 is designed so that a communication message transmitted from the data transmitting unit 23 is not included in the usage status data 210, and, at this time, "0" is set for the usage status data 210.

The usage status predicting unit 22 predicts an idle time of the communicative bus 15 with respect to a "following detection period Tc" that is a detection period Tc consecutively following the latest detection period Tc. In other words, the usage status predicting unit 22 predicts an idle time with respect to a "following detection period Tc," which is in the future from the present time. The idle time is stored in the usage status data 210, for example, for each determination period Δt. Therefore, the prediction of a usage status is performed for each determination period Δt. In the present embodiment, each time the detection result of a determination period Δt is added to the usage status data 210 of the latest detection period Tc, the usage status predicting unit 22 performs a prediction with respect to a period corresponding to that determination period Δt in the following detection period Tc. In other words, the usage status predicting unit 22 predicts a determination period Δt following the present determination period Δt with an interval of a detection period Tc between the two determination periods Δt. The prediction may be performed collectively even if its start is somewhat delayed.

Based on a piece of or pieces of usage status data (210, for example), the usage status predicting unit 22 predicts an idle time with respect to a "following detection period Tc," and allows a volatile storage device or the like to hold the predicted result as prediction data 221. Based on, for example, the latest usage status data 210 (see FIG. 2) obtained by the bus monitoring unit 21, the usage status predicting unit 22 predicts an idle time with respect to a "following detection period Tc," and generates prediction data 221 (see FIG. 3). In the usage status predicting unit 22, for example, when a prediction is performed for each determination period Δt based only on the latest usage status data 210, the prediction data 221 with respect to the "following detection period Tc" becomes the same as the latest usage status data 210. In the usage status predicting unit 22, for example, when the held content of first to ninth determination periods Δt of the latest usage status data 210 is "110011000," the prediction of each period corresponding to the first to ninth determination periods Δt of the prediction data 221 becomes "110011000." Likewise, in the usage status predicting unit 22, when an m-th determination period Δt of the latest usage status data 210 is "1," the prediction of a period corresponding to the m-th determination period Δt of the prediction data 221 becomes "1." This is an example of predicting an idle time by use of one piece of usage status data.

The data transmitting unit 23 includes a transmission part of a so-called CAN transceiver, and transmits a communication message based on a CAN protocol to the communicative bus 15 in accordance with the CAN protocol. In the data transmitting unit 23, a communication message is input from an external device, such as the maintenance device 30 or the user device 31 connected to the data transmission module 20. The data transmitting unit 23 allows the volatile storage device or the like of the data transmission module 20 to temporarily hold the input communication message. Thereafter, the data transmitting unit 23 transmits, i.e., transfers the communication message input from the external device to the communicative bus 15. In the present embodiment, the data transmitting unit 23 refers to the prediction data 221, and, as a result, issues a command to itself to transmit a communication message in an idle time included in this prediction data 221, and transmits the communication message to the communicative bus 15 based on that command. As a result, the data transmitting unit 23 transmits the communication message to the communicative bus 15 in a period during which the possibility that another communication message will be transmitted is low. This reduces the possibility that an influence will be exerted on the transmission of the other communication message that uses the same communicative bus 15.

In the present embodiment, the data transmitting unit 23 transmits a communication message based on pre-generated prediction data 221. Therefore, there is no need to monitor the communicative bus 15 in real time and generate prediction data 221 in order to perform transmission at the present time. In other words, in the data transmitting unit 23, the possibility that the transmission of a communication message will be influenced by the delay in processing in the usage status predicting unit 22 and so forth is small. Additionally, it is only necessary for the usage status predicting unit 22 to generate the prediction data 221 before the data transmitting unit 23 uses it. Therefore, the degree of temporal freedom concerning the generation of the prediction data 221 is large.

If the prediction data 221 is intended to be generated in real time when the data transmitting unit 23 transmits a communication message, a timing at which the communication message is transmitted will be inevitably delayed by a period of time required to generate the prediction data 221.

Operation of the data transmission module 20 will now be described.

First, the operation of the bus monitoring unit 21 will be described.

As shown in FIG. 2, on the supposition that the detection period Tc (time n) is defined as one period, the bus monitoring unit 21 repeatedly detects the status of the communication bus, i.e., repeatedly detects whether a communication message is flowing (presence or absence of data). Thereafter, the bus monitoring unit 21 repeatedly obtains a detection result as a piece of usage status data 210 and repeatedly causes the detection result to be stored (detection step). In FIG. 2, only one period is shown in the figure, and other periods are not shown for the illustrative purposes.

When new usage status data 210 corresponding to the latest detection period Tc is obtained, the bus monitoring unit 21 shifts pieces of usage status data 210, for example, obtained in the past to the past respectively by the amount of data equivalent to one time. When pieces of usage status data are held by the amount of data equivalent to the number of times required for the prediction by the usage status predicting unit 22, the past usage status data that exceeds the number of times required for the prediction is abandoned each time new data is added.

The bus monitoring unit 21 determines whether a communication message flows to the communicative bus 15 (presence or absence of data) for each determination period Δt. Thereafter, the bus monitoring unit 21 sets this determination result for a corresponding period (determination period Δt) of the usage status data 210. In other words, when data is "present" in the communicative bus 15, "1" is set for the corresponding period (determination period Δt) of the usage status data 210, and, when data is "absent" in the communicative bus 15, "0" is set for the corresponding period (determination period Δt) of the usage status data 210. The bus monitoring unit 21 creates usage status data 210 corresponding to one detection period Tc so that one to m determination results ("0" or "1") are included.

The bus monitoring unit 21 detects that data is "absent" in the communicative bus 15 even if it has detected a communication message transmitted from the data transmitting unit 23. The reason is that a period in which a communication message is transmitted from the data transmitting unit 23 is a period that enables the data transmitting unit 23 to transmit a communication message, and that there is no need to exclude this period from idle times predicted with respect to a next detection period Tc.

Next, operation of the usage status predicting unit 22 will be described.

Figure 4:
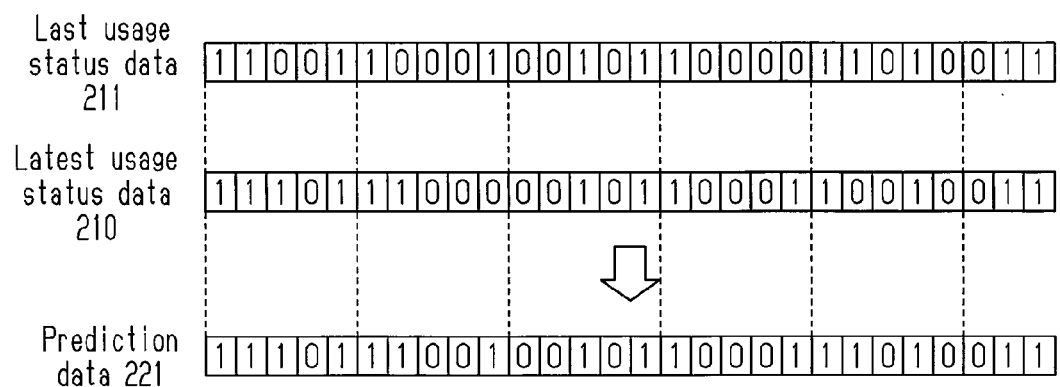
FIG. 4 is a diagram showing a mode in which prediction data is predicted from usage status data in the communication system shown in FIG. 1.

As shown in FIG. 4, the usage status predicting unit 22 predicts an idle time, for example, based on the latest usage status data 210 and the last usage status data 211 (prediction step). Thereafter, the usage status predicting unit 22 generates prediction data 221 including the predicted idle time. In the present embodiment, an idle time of a corresponding period in the prediction data 221 is predicted each time a determination result is added to the latest usage status data 210, i.e., each time a determination period Δt elapses.

The usage status predicting unit 22 refers to a determination result ("0" or "1") of the same period (having a specific position in the numbered series) in the latest usage status data 210 and the last usage status data 211, and predicts whether the period (having a specific position in the numbered series) of the prediction data 221 corresponding to the period (having a specific position in the numbered series) to which reference has been made is an idle time. When the combination of determination results of the same period in the latest usage status data 210 and the last usage status data 211 is "0, 0," the usage status predicting unit 22 predicts this period of the prediction data 221 to be "an idle time," i.e., to be "0." When the combination of determination results of the same period in the latest usage status data 210 and the last usage status data 211 is any one of "1, 0," "0, 1," and "1, 1," the usage status predicting unit 22 predicts this period of the prediction data 221 to be "not an idle time," i.e., to be "1." This is an example of predicting an idle time by use of two pieces of usage status data.

In other words, the usage status predicting unit 22 calculates the value of the prediction data 221, for example, by applying the arithmetic of logical addition (OR operation) to the combination of determination results. The value of the prediction data 221 may be calculated by logical multiplication (AND operation) without being limited to logical addition, or may be fixed at "0" or "1" based on a comparison between the percentage of "0" (or "1") in the combination and a predetermined percentage.

Operation of the data transmitting unit 23 will now be described.

Figure 3:
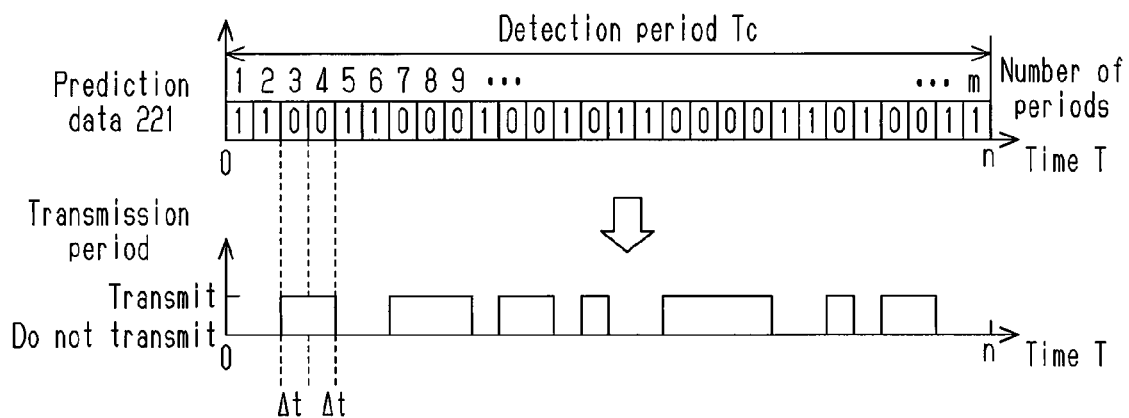
FIG. 3 is a diagram that schematically shows prediction data predicted by the communication system shown in FIG. 1.

As shown in FIG. 3, when the bus monitoring unit 21 starts a detection period Tc subsequent to the latest detection period Tc, the data transmitting unit 23 transmits a communication message in a period of "0" (determination period Δt) while referring to the prediction data 221 (transmission step). In detail, the data transmitting unit 23 temporarily stores a communication message input from an external device, and transmits the communication message stored therein when an idle time is reached. The data transmitting unit 23 is not necessarily required to transmit a communication message to the communicative bus 15 if the data transmitting unit 23 does not store communication messages even when it is an idle time. Additionally, when a communication message is input from the external device, the data transmitting unit 23 may directly transmit this communication message to the communicative bus 15 without temporarily storing this communication message if it is an idle time.

As a result, the data transmission module 20 is allowed to transmit the communication message input from the external device to the communicative bus 15 in an idle time. In other words, the data transmission module 20 is capable of reducing the influence of the transmission of the communication message input from the external device to the communicative bus 15 upon communication messages transmitted from the first to third ECUs 11 to 13. In particular, the possibility that communication messages transmitted from the first to third ECUs 11 to 13 originally connected to the communicative bus 15 include important information is high. Therefore, it is possible to maintain the reliability of the vehicle 10 by reducing the delay of these communication messages. On the other hand, it is possible to improve the convenience of the vehicle 10 by taking in the information from the external device while restraining a bad influence from being exerted on the vehicle 10.

Additionally, the data transmission module 20 transmits a communication message in an idle time of the communicative bus 15. Therefore, it is possible to avoid the occurrence of arbitration when this communication message is transmitted. The arbitration preferentially executes the transmission of a communication message that is small in message ID (i.e., that is high in priority), and puts the transmission of a communication message that is large in message ID (i.e., that is low in priority) on standby. Therefore, the number of communication messages waiting to be transmitted rises. Therefore, the bus load factor of the communicative bus 15 rises, and the delay of the transmission of communication messages is liable to be increased regardless of the degree of priority. In particular, a communication message that is low in priority is liable to become large in the delay of the transmission. However, according to the present embodiment, a communication message from an external device does not easily generate arbitration. Therefore, it is possible to immediately transmit the communication message even if this communication message is low in priority. In other words, according to the present embodiment, the number of communication messages waiting to be transmitted is restrained from being increased. Therefore, the delay of the transmission of communication messages including communication messages low in priority is reduced. Additionally, in communication messages from the external device, the time until these messages start to be transmitted is shortened.

Additionally, the data transmission module 20 transmits a communication message in an idle time. Therefore, the data transmission module 20 is capable of transmitting the communication message while restraining the occurrence of arbitration even if the bus load factor is high. As a result, a delay caused when a communication message is transmitted is made smaller than in a case in which communication control is performed in accordance with the bus load factor. In other words, the waiting time until a communication message starts to be transmitted from the data transmission module 20 is short. Additionally, the use of the idle time improves the utilization factor of the communicative bus and enables effective use of a bus bandwidth. Additionally, the occurrence of arbitration is restrained. Therefore, an influence of a communication message transmitted by an ECU continuously connected to the communicative bus 15 upon the transmission is restrained, e.g., the occurrence of the delay is restrained.

Additionally, the data transmission module 20 generates prediction data 221 while the idle time is conditioned by only the detection period Tc and the determination period Δt. Therefore, the message ID of a communication message flowing through the communicative bus 15 or information about the transmission period of each communication message, for example, is not required to generate the prediction data 221. As a result, for example, a time-consuming job to manage information, such as a message ID, is eliminated, and hence the configuration of the data transmission module 20 is simplified.

Additionally, the data transmission module 20 is capable of properly managing the transmission of a communication message that occupies the bus bandwidth of the communicative bus 15, such as a communication message for reprogramming or a communication message by a DoS attack.

For example, the data transmission module 20 allows a communication message for reprogramming to be transmitted as quickly as possible without occupying the bus bandwidth of the communicative bus 15. In other words, even if reprogramming is executed, an influence that occurs in the communication of other communication messages will be suppressed. Additionally, the occurrence of arbitration is restrained by transmitting a communication message while aiming at an idle time, and the awaiting of an uncertain transmission opportunity is avoided, so that reprogramming is readily executed.

Additionally, for example, even if a DoS attack is attempted from the user device 31 and even if the communication message is an attacking one that intends to occupy the bus bandwidth, this communication message is transmitted only in an idle time. Therefore, it is possible to restrain an influence caused in the communication of other communication messages.

The communication apparatus of the present embodiment achieves the following advantages.

(1) The data transmission module 20 transmits a communication message to the communicative bus 15 in an idle time predicted with respect to this communicative bus 15, in which period a communication message is not transmitted. This reduces the possibility that the transmission of this communication message will coincide with the transmission of a communication message from another ECU and will be delayed.

Additionally, in a communication message transmitted in an idle time, arbitration does not occur between this communication message and another communication message. Therefore, the communication message is readily transmitted regardless of the degree of the set priority.

Additionally, the data transmission module 20 performs the prediction of an idle time without depending on the transmission period of a communication message. Therefore, it is possible to properly deal with the transmission of an aperiodic message transmitted in accordance with an event and properly deal with the transmission of a message of an offset period.

Additionally, the transmission of a communication message in an idle time reduces an influence exerted on an existing message to be transmitted, e.g., restrains the occurrence of a delay caused by putting the transmission on standby.

(2) It is possible for the data transmission module 20 to predict an idle time based on a piece of the latest usage status data 210 obtained in a detection period Tc.

(3) The prediction of an idle time is performed based on the setting of both the detection period Tc and the determination period Δt. Therefore, the idle time is easily predicted.

(4) Based on a detection result of the determination period Δt obtained from the usage status data 210, an idle time corresponding to this determination period Δt in the prediction data 221 is predicted. Therefore, the idle time is properly predicted.

(5) An idle time of the following detection period Tc is predicted in accordance with the fact that the detection result of the determination period Δt is obtained in the usage status data 210 of the latest detection period Tc. Therefore, sufficient time is secured for the prediction of an idle time with respect to the following detection period Tc, which starts following the latest detection period Tc.

(6) In a communication message transmitted by the data transmitting unit 23, the determination that data is "absent" in the communicative bus 15 allows the prediction of an idle time to be unaffected by the communication message transmitted by itself (data transmitting unit 23). As a result, it is possible to properly predict an idle time when a communication message is transmitted in a continuous detection period Tc.

(7) It is possible to include many periodic messages in the detection period Tc by periodically setting the detection period Tc in the range of from 100 ms to 10 s. Therefore, the prediction accuracy is improved. Even if the detection period Tc is set to be matched with the period of a communication message having a long transmission period, transmission periods of many periodic messages are included in the detection period Tc. Therefore, the prediction accuracy is improved. Additionally, if it is set to be matched with a period that is the lowest common multiple of the transmission periods of a plurality of communication messages, the detection period Tc suits the transmission periods of a plurality of periodic messages to be targeted. Therefore, the prediction accuracy is improved.

(8) Even when a bus load generated in the communicative bus 15 by means of a communication message of the CAN protocol, which is often employed in an in-vehicle LAN, is high, a delay caused in the communication message is reduced. An important message concerning the traveling of the vehicle 10 is included in the in-vehicle LAN. Thus, for example, the possibility is reduced that this important message will be delayed by the influence of a message whose importance is lower.

Second Embodiment

A communication system including a communication apparatus according to a second embodiment of the present invention will now be described with reference to FIGS. 5 and 6.

The present embodiment is configured in the same way as the first embodiment, except for a method for generating prediction data 221 by means of the usage status predicting unit 22. Therefore, configurations that differ from those of the first embodiment are described in the following. For the illustrative purposes, the same reference numerals are given to those components that are like or the same as the corresponding components of the first embodiment and detailed explanations are omitted.

Figure 5:
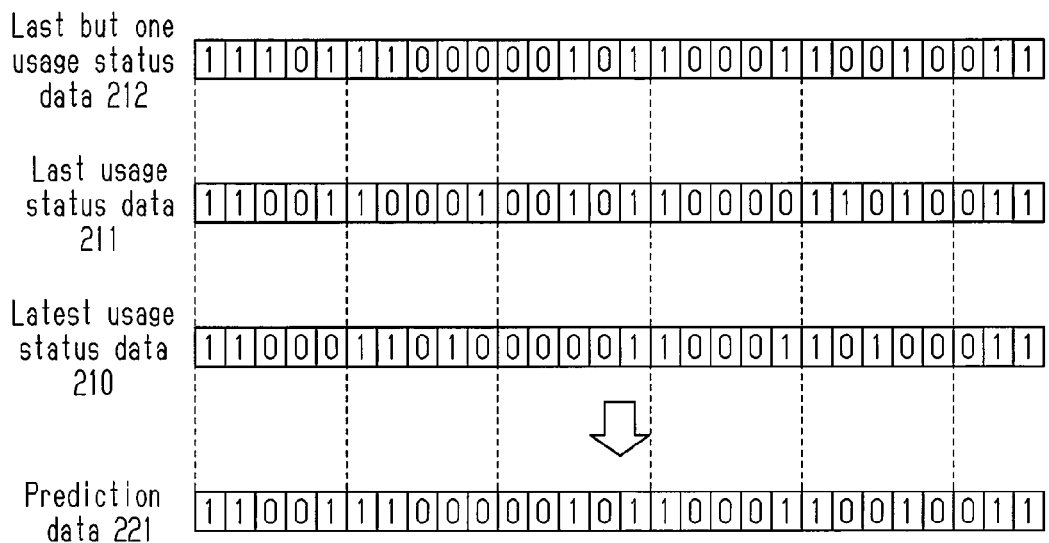
FIG. 5 is a diagram showing a mode in which prediction data is predicted from usage status data in a communication system including a communication apparatus according to a second embodiment of the present invention.

As shown in FIG. 5, the usage status predicting unit 22 refers to a determination result ("0" or "1") of the same period (having a specific position in the numbered series) in the latest usage status data 210, the last usage status data 211, and the last but one usage status data 212. Thereafter, based on three determination results obtained from the same period of the three pieces of data, the usage status predicting unit 22 predicts whether the period (having a specific position in the numbered series) of the prediction data 221 corresponding to the period (having a specific position in the numbered series) to which reference has been made is an idle time.

Figure 6:
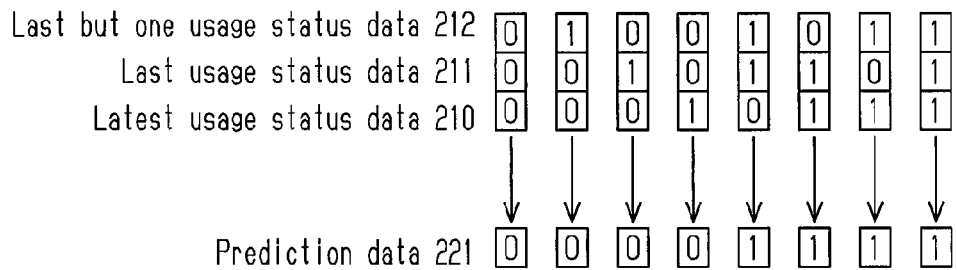
FIG. 6 is a diagram showing a calculation method for calculating prediction data shown in FIG. 5.

As shown in FIG. 6, when the combination of determination results of the same period in the latest usage status data 210, the last usage status data 211, and the last but one usage status data 212 is "0, 0, 0," the usage status predicting unit 22 predicts this period of the prediction data 221 to be "an idle time," i.e., to be "0." When the combination of determination results of the same period in the latest usage status data 210, the last usage status data 211, and the last but one usage status data 212 is any one of "0, 0, 1," "0, 1, 0," and "1, 0, 0," the usage status predicting unit 22 predicts this period of the prediction data 221 to be "an idle time," i.e., to be "0." On the other hand, when the combination of determination results of the same period in the latest usage status data 210, the last usage status data 211, and the last but one usage status data 212 is any one of "0, 1, 1," "1, 1, 0," "1, 0, 1," and "1, 1, 1," the usage status predicting unit 22 predicts this period of the prediction data 221 to be "not an idle time," i.e., to be "1."

In other words, when the ratio of "0" in the three determination results is "½" (50%), which is a threshold value, or more, the usage status predicting unit 22 predicts this period of the prediction data 221 to be "an idle time," i.e., to be "0." On the contrary, when the ratio of "0" in the three determination results is less than "½" (50%), which is a threshold value, the usage status predicting unit 22 predicts this period of the prediction data 221 to be "not an idle time," i.e., to be "1."

When the ratio of "0" is "⅔" (about 66%), which is a threshold value, or more, the usage status predicting unit 22 may predict this period of the prediction data 221 to be "0," and, when the ratio of "0" is less than "⅔" (about 66%), which is a threshold value, the usage status predicting unit 22 may predict this period of the prediction data 221 to be "1." This improves the prediction accuracy.

When the ratio of "0" is "⅘" (about 80%), which is a threshold value, or more, the usage status predicting unit 22 may predict this period of the prediction data 221 to be "0," and, when the ratio of "0" is less than "⅘" (about 80%), which is a threshold value, the usage status predicting unit 22 may predict this period of the prediction data 221 to be "1." This further improves the prediction accuracy. In this case, the period is predicted to be "0" only when the combination is "0, 0, 0," whereas the period is predicted to be "1" except when the combination is "0, 0, 0."

The value of the prediction data 221 may be calculated by logical addition (OR operation) or logical multiplication (AND operation) without being limited to the determination of "0" (or "1") based on a comparison between the ratio of determination results of "0" (or "1") in combinations and a predetermined ratio.

As a result, the prediction data 221 is predicted from the three pieces of usage status data 210 to 212. Therefore, a prediction is performed more properly.

As described above, according to the communication apparatus of the present embodiment, it is possible to obtain the following advantages in addition to the advantages (1) to (8) mentioned in the first embodiment.

(9) It is possible to calculate an idle time based on a comparison between a threshold value and a detection result with respect to one determination period Δt of one or more pieces of usage status data 210, for example. In other words, it is possible to flexibly perform a predicting process.

Additionally, when a plurality of pieces of usage status data are used, an idle time is properly predicted based on a ratio at which a communication message does not flow even if there are differences between detection results of the plurality of pieces of usage status data.

Other Embodiments

The above illustrated embodiments may be modified as follows.

Additionally, based on the frequency of communication messages to be transferred, the data transmission module may determine whether a communication message to be transferred influences the communicative bus, and may impart the determination to a user or other ECUs. Additionally, a communication message that influences the communicative bus may stop being transferred to the communicative bus. This reduces the possibility that a communication message that influences the communicative bus will be transmitted from an external device. As a result, the communication apparatus improves in a function to manage communication messages from an external device. Additionally, the reliability of a communication system including this communication apparatus improves.

Additionally, when an idle time detected from the communicative bus 15 is lower than a predetermined ratio, the data transmission module may determine that there is a possibility that an illegal communication message will be flowing through the communicative bus, and may impart it to a user or the like, and may impart it to other ECUs. As a result, the communication apparatus improves in a function to manage communication messages from an external device. Additionally, the reliability of a communication system including this communication apparatus improves.

In each of the illustrated embodiments, it is determined that data is "absent" in the communicative bus 15 even when a communication message transmitted by the data transmitting unit 23 is detected. However, without being limited to this, it may be determined that data is "present" in the communicative bus when a communication message transmitted by the data transmitting unit is detected. For example, when a communication message is transmitted with a longer interval than a plurality of detection periods used for predictions, the prediction of an idle time is unaffected by the transmission of previous communication messages. This improves the flexibility of design of this communication apparatus.

In each of the illustrated embodiments, an idle time is predicted based on the determination result "0" or "1" of usage status data. However, without being limited to this, a weighting operation may be applied to "0" or "1" of usage status data, and an idle time may be predicted in consideration of the resulting weight.

Figure 7:
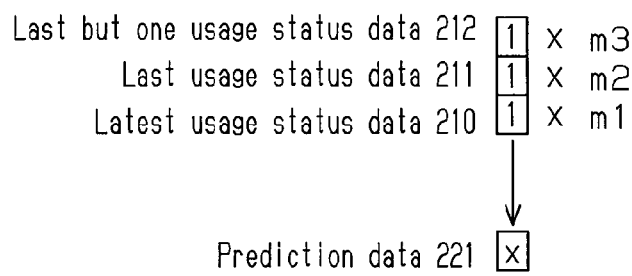
FIG. 7 is a diagram showing a calculation method for calculating prediction data in a communication system including a communication apparatus according to another embodiment of the present invention.

As shown in FIG. 7, for example, the weight of a determination result of the latest usage status data 210 may be defined as "m1," and the weight of a determination result of the last usage status data 211 may be defined as "m2," and the weight of a determination result of the last but one usage status data 212 may be defined as "m3." Based on a result obtained by multiplying the determination result of the usage status data by this weight, the usage status predicting unit may predict an idle time. In detail, the value x is calculated by adding the product of the determination result of the latest usage status data 210 and "m1," the product of the determination result of the last usage status data 211 and "m2," and the product of the determination result of the last but one usage status data 212 and "m3" together. Thereafter, the usage status predicting unit may predict that "it is an idle time" ("0") on the condition that the resulting value x is below a predetermined threshold value, and the usage status predicting unit may predict that "it is not an idle time" ("1") on the condition that the resulting value x is greater than the predetermined threshold value. In other words, the prediction of an idle time is performed in consideration of the utility of usage status data.

For example, the weight may be set to have the relationship of m1>m2>m3 so that the weight becomes higher in proportion to the proximity to the following detection period Tc to predict an idle time and so that the weight becomes lower in proportion to the temporal distance from the following detection period Tc. As a result, "1" that is a determination result of the latest usage status data 210 is evaluated higher than "1" that is a determination result of the last usage status data 211 or than "1" that is a determination result of the last but one usage status data 212. In other words, the prediction accuracy of the prediction data 221 is improved by performing a prediction while placing much importance on the latest usage status data 210. This improves the flexibility of design of the communication apparatus.

In each of the illustrated embodiments, the usage status predicting unit 22 predicts an idle time by use of one to three pieces of usage status data. However, without being limited to this, if it is possible to predict an idle time, more pieces of usage status data than three pieces may be used to predict an idle time. This improves the flexibility of design of the communication apparatus.

In each of the illustrated embodiments, an external device is connected to the data transmission module 20 via a DLC. However, without being limited to this, if the external device is capable of being communicably connected to the data transmission module, the external device may be connected to the data transmission module via a connector or the like other than the DLC. This improves the flexibility of design of the communication apparatus.

In each of the illustrated embodiments, an external device is connected to the data transmission module 20 by means of wires. However, without being limited to this, an external device may be connected to the data transmission module by means of wireless communications. For example, the data transmission module may be provided with a wireless communication unit, and the external device may be likewise provided with a corresponding wireless communication unit, so that wireless communications are performed between the data transmission module and the external device. This expands the range of application of the communication apparatus.

In each of the illustrated embodiments, the data transmission module 20 transfers information input from an external device to the communicative bus 15. However, without being limited to this, the data transmission module may transfer information input from other ECUs to the communicative bus, or may use information output by the data transmission module itself when it is transmitted to the communicative bus. Additionally, the data transmission module may be included in ECUs. This allows communication messages to be output by internal devices (ECUs, for example) of the vehicle to the communicative bus while restraining an influence exerted on other communications. This expands the range of application of this communication apparatus.

In the each of the illustrated embodiments, the communication system is a system based on a CAN protocol. However, without being limited to this, the protocol of this communication system is merely required to be a communication protocol by which a state can occur in which a communication message does not flow in a communication line. In other words, the communication protocol applicable to the communication system may be a communication protocol, such as Ethernet (registered trademark) or FlexRay (registered trademark), other than the CAN protocol. Additionally, an idle time of this communication protocol may be predicted, and may transmit a communication message in this idle time. This improve the flexibility of design of the communication apparatus and expands the range of application of the communication apparatus.

In the each of the illustrated embodiments, a communication system is mounted in the vehicle 10. However, without being limited to this, a part of or the entirety of the communication system may be arranged outside the vehicle. As a result, the communication apparatus becomes applicable also to communication systems composed of CANs excluding those of vehicles.

In the each of the illustrated embodiments, a communication system is mounted in the vehicle 10. However, without being limited to this, the communication system may be provided in a mobile body, such as a vessel, a railroad, an industrial machine, or a robot, other than the vehicle. This expands the range of application of the communication apparatus.

DESCRIPTION OF THE REFERENCE NUMERALS

10 . . . Vehicle, 11 to 13 . . . First to Third Electronic Control Unit (ECU), 15 . . . Communicative Bus, 20 . . . Data Transmission Module, 21 . . . Bus Monitoring Unit, 22 . . . Usage Status Predicting Unit, 23 . . . Data Transmitting Unit, 30 . . . Maintenance Device, 31 . . . User Device, 210 to 212 . . . Usage Status Data, 221 . . . Prediction Data, $\Delta T$ . . . Determination Period, Tc . . . Detection Period.

The invention claimed is:

1. A communication apparatus that is connected to a communication line, through which communication messages are transferred, to be capable of transmitting and receiving communication messages, the communication apparatus comprising:
a detecting unit that detects a period in which a communication message flows through the communication line over a fixed detection period of time and that obtains a detection result thereof as usage status data of this detection period;
a predicting unit that, based on the obtained usage status data of the detection period, predicts an idle time in which a communication message does not flow through the communication line; and
a transmitting unit that transmits a communication message to the communication line in the predicted idle time, wherein the detection period includes a plurality of periodically consecutive determination periods, the detecting unit repeatedly detects a period in which a communication message flows to the communication line for each of the determination periods, and based on a detection result of one of the determination periods included in the usage status data, the predicting unit predicts an idle time of a following detection period corresponding to the one of the determination periods.

2. The communication apparatus according to claim 1, wherein, based on one or more pieces of usage status data including usage status data corresponding to a latest detection period, the predicting unit predicts an idle time of a following detection period subsequent to the latest detection period.

3. The communication apparatus according to claim 1, wherein
the predicting unit
obtains one or more detection results from a to-be-targeted determination period in the one or more pieces of usage status data,
calculates a communication message based on the obtained one or more detection results, and
compares, with a threshold value, a ratio at which the calculated communication message does not flow through the communication line, thereby predicting an idle period of the following detection period corresponding to the to-be-targeted determination period.

4. The communication apparatus according to claim 1, wherein, each time a detection result is obtained with respect to each determination period of the latest detection period, the predicting unit predicts an idle time of the following detection period corresponding to a determination period for which the detection result has been obtained.

5. The communication apparatus according to claim 1, wherein the predicting unit predicts the idle period in consideration of a weight based on utility that is set in the usage status data.

6. The communication apparatus according to claim 5, wherein the weight is set to be highest with respect to the usage status data of the latest detection period, and
the older the usage status data, the lower the weight becomes.

7. The communication apparatus according to claim 1, wherein the detecting unit does not include communication messages transmitted from the transmitting unit in the obtained usage status data.

8. The communication apparatus according to claim 1, wherein the detection period is periodically set in a range of from 100 ms to 10 s.

9. The communication apparatus according to claim 1, wherein the detection period is set in accordance with a period of a communication message having a longest transmission period of a plurality of communication messages.

10. The communication apparatus according to any claim 1, wherein the detection period is set in accordance with a period that is a lowest common multiple of transmission periods of a plurality of communication messages.

11. The communication apparatus according to claim 1, wherein
a part of or an entirety of the communication line is mounted in a vehicle, and the communication message is based on a Controller Area Network (CAN) protocol.

12. A communication method that is used by a communication apparatus to transmit communication messages, wherein the communication apparatus is connected to a communication line, through which communication messages are transferred, the communication method comprising:
- detecting a period in which a communication message flows through the communication line over a fixed detection period of time and obtaining a detection result thereof as usage status data of this detection period;
- based on the obtained usage status data of the detection period, predicting an idle time in which a communication message does not flow through the communication line; and
- transmitting a communication message to the communication line in the predicted idle time, wherein
- the detection period includes a plurality of periodically consecutive determination periods,
- in the obtaining of the usage status data, a period in which a communication message flows to the communication line is repeatedly detected for each of the determination periods, and
- in the predicting an idle time, based on a detection result of one of the determination periods included in the usage status data, an idle time of a following detection period corresponding to the one of the determination periods is predicted.

* * * * *